United States Patent [19]

Minoura

[11] 4,299,438
[45] Nov. 10, 1981

[54] SCANNING OPTICAL SYSTEM HAVING AT LEAST TWO REFLECTING SURFACES AND AN AFOCAL OPTICAL SYSTEM

[75] Inventor: Kazuo Minoura, Yokohama, Japan

[73] Assignee: Canon Kabushiki Kaisha, Tokyo, Japan

[21] Appl. No.: 30,658

[22] Filed: Apr. 16, 1979

Related U.S. Application Data

[63] Continuation of Ser. No. 875,103, Feb. 3, 1978, abandoned.

[30] Foreign Application Priority Data

Feb. 4, 1977 [JP] Japan .................................. 52-11278

[51] Int. Cl.³ .............................................. G02B 27/17
[52] U.S. Cl. ....................................... 350/6.6; 350/6.8
[58] Field of Search ................................ 350/6.1–6.91, 350/232

[56] References Cited

U.S. PATENT DOCUMENTS

| | | | |
|---|---|---|---|
| 3,573,849 | 4/1971 | Herriot et al. | 350/6.8 |
| 3,668,984 | 6/1972 | Rosin | 350/6.5 |
| 3,961,838 | 6/1976 | Zanoni | 350/232 |
| 3,973,833 | 8/1976 | Lawson | 350/6.8 |

FOREIGN PATENT DOCUMENTS 487318 6/1938 United Kingdom ................ 350/6.8

Primary Examiner—Jon W. Henry
Attorney, Agent, or Firm—Fitzpatrick, Cella, Harper & Scinto

[57] ABSTRACT

A scanning optical system is disclosed which comprises a scanning device having at least two reflecting surfaces thereon and an afocal optical system directing the beam reflected by a first reflecting surface of the scanning device to a second reflecting surface thereof different from the first one. The afocal optical system is so disposed that the beam incident upon the second surface may move in the opposite direction to the rotational direction of the scanning device.

5 Claims, 8 Drawing Figures

SCANNING OPTICAL SYSTEM HAVING AT LEAST TWO REFLECTING SURFACES AND AN AFOCAL OPTICAL SYSTEM

This is a continuation, of application Ser. No. 875,103 filed Feb. 3, 1978 now abandoned.

BACKGROUND OF THE INVENTION

1. Field of the Invention

The present invention relates to a scanning optical system in which a beam is deflected using a scanning device such as a galvanomirror or a rotary polygon mirror and which permits an increase in the angle of deflection by the single deflecting device itself so as to allow high speed scanning.

2. Description of the Prior Art

It is known in the art of scanning optical systems to arrange a plural number of scanning devices in series so as to obtain a wide scanning angle. However, this known method is troublesome and complicated to carry out since there are used a plural number of individual scanning devices. It is a problem to effect synchronism of rotation between these scanning devices. Further, positional variations caused by inclination (fall-down) of the rotation axes should be taken into consideration.

To eliminate these problems, it has been proposed, for example by U.S. Pat. No. 3,771,850, that the scanning angle be widened by using a single scanning device which deflects a beam plural times on it. According to the method, a beam before traversing a transmission optical system used as a means for widening the angle of deflection and a beam after traversing the transmission optical system are reflected upon the same reflecting surface of the scanning device. This arrangement also has some disadvantages and problems. For example, there occurs an important problem of overlap of the optical paths of the beam before deflection and of the beam after deflection and having a widened scanning angle. This overlapping of the optical paths can not be eliminated without giving up the widening of the scanning angle.

If one makes a beam incident upon the scanning device with an angle between the incident beam and the scanning surface of the device and separates the beam before deflection from the beam after deflection to eliminate the overlap of the optical paths, then the scanning line of the beam after deflection will have a conical shape. Herein, the term "scanning surface of a scanning device" is to be understood as a plane that is formed by the normal of the reflecting surface of the scanning device as the latter rotates.

SUMMARY OF THE INVENTION

Accordingly, it is a primary object of the present invention to provide an improved scanning optical system which is able to scan a wide angle area while widening the angle of deflection of a beam deflected by the scanning device.

A further particular object of the invention is to provide a scanning optical system which eliminates the above mentioned difficulties and disadvantages involved in the known scanning optical systems.

To attain these and other objects according to the present invention, there is provided a scanning optical system comprising a scanning device having at least two reflecting surfaces and an afocal optical system. The collimating beam incident upon the scanning device is reflected by a first reflecting surface of the device and after passing through the afocal optical system the beam reflected by the first reflecting surface is again incident upon a second reflecting surface of the same scanning device. The first and second reflecting surfaces are different from each other. The afocal optical system is so set that the beam incident upon the second reflecting surface may move in the opposite direction to the moving direction of the second reflecting surface as the scanning device rotates. In other words, the beam incident upon the second reflecting surface is changed in its incident direction as viewed from the side of the scanning device with time. This change in incident direction of the beam is made in a direction opposite to the rotational direction of the second reflecting surface.

In the arrangement of the invention, the spatial position of the beam incident upon the scanning device and that of the beam finally emerging from the device are entirely different from each other. Therefore, there is caused no problem of overlapping of the optical path of the incident beam and that of the deflected beam when the scanning angle is widened.

Also, since the reflecting surfaces of the scanning device connected by the afocal optical system are different from each other, it is possible to control the angle of deflection (scanning angle) finally obtained as desired by changing the characteristics of the afocal optical system.

Other objects, features and advantages of the invention will appear more fully from the following description taken in connection with the accompanying drawings.

DESCRIPTION OF THE PREFERRED EMBODIMENTS

Figure 1:
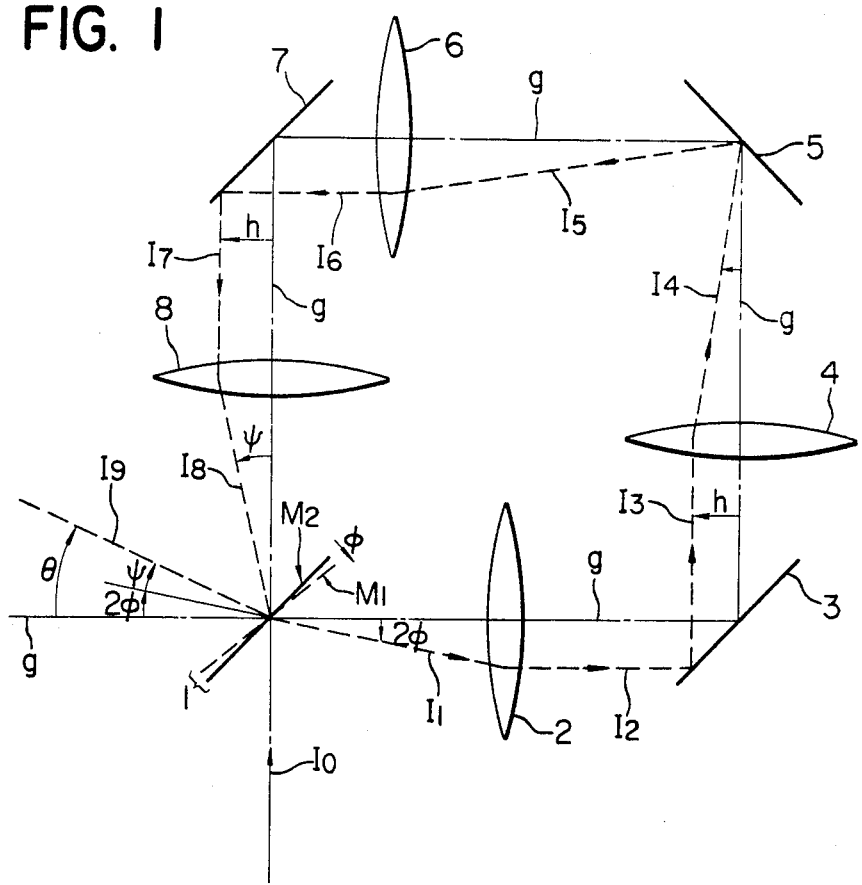
FIGS. 1 through 4 are schematic illustrations of various embodiments of the scanning optical system of the invention.

Referring to FIG. 1 there is shown one embodiment of the scanning optical system according to the invention. The principle based on which the angle of deflection is widened is explained in detail referring to FIG. 1.

The reference numeral 1 designates a scanning device such as a galvanomirror with its both side surfaces being made as reflecting surfaces. 2, 4, 6 and 8 are lenses and 3, 5 and 7 are reflecting mirrors. A beam $I_0$ incident upon the scanning device is deflected by its reflecting surface $M_1$ to form a beam $I_1$ incident upon the lens 2. Since the focal point of the object side of the lens 2 lies in the vicinity of the position at which the beam $I_0$ is reflected by the reflecting surface $M_1$, the beam passed through the lens 2 becomes a collimating beam $I_2$. The beam $I_2$ is further deflected by the reflecting mirror 3 to form a beam $I_3$ incident upon the lens 4. The lens 4 is so disposed that the position of its focal point of object side is coincident with the position of the focal point of the image side of the lens 2. The beam $I_3$ is refracted by the lens 4 to form beam $I_4$ which is reflected by the reflecting mirror 5 to form a beam $I_5$. The beam $I_5$ is transformed into a collimating beam $I_6$ by the lens 6 which is so disposed that the position of its focal point of the object side is coincident with the position of the focal point of the image side of the lens 4.

The collimating beam $I_6$ is reflected by the reflecting mirror 7 to form a beam $I_7$ incident upon the lens 8 which refracts the beam $I_7$ to form a beam $I_8$. The lens 8 is so designed that the position of its focal point of the object side is coincident with that of the focal point of the image side of the lens 6 whereas its focal point of the image side lies in the vicinity of the reflecting surface $M_2$ of the scanning device 1. The beam $I_8$ is reflected by the reflecting surface $M_2$ to form a beam $I_9$ running toward a condenser lens 33 not shown but later described. The respective optical axes g of the lenses (2,4,6,8) are made coincident to each other through the reflecting mirrors (3,5,7). The starting position of the rotary scanning device 1 is indicated by solid line in the drawing and the position of the device after a rotation by angle $\phi$ is suggested by phantom line in the drawing.

When the scanning device is in its starting position, the incident beam $I_0$ deflected by the reflecting surface $M_1$ travels along the optical axis of afocal optical system (2,3,4,5,6,7,8; hereinafter referred to as transmission optical system). On the contrary, if the scanning device 1 is rotated by the angle of $\phi$ from its starting position, then the beam $I_1$ is deflected by $2\phi$. The transmission optical system has such characteristic that the beam having the angle of deflection of $2\phi$ may be transformed finally into the beam $I_8$ having the angle of deflection of $\psi$ incident upon the reflecting surface $M_2$ of the scanning device 1.

This relation between the two angles of deflection, $2\phi$ and $\psi$ can be changed as desired by changing the arrangement of the transmission optical system. The beam $I_8$ moves in the opposite direction to the rotational direction of the scanning device 1 as the latter rotates. Therefore, the beam $I_9$ reflected upon the reflecting surface $M_2$ of the scanning device 1 has an angle of deflection larger by $\psi$ than the angle of $2\phi$ which the beam $I_1$ makes with the optical axis. This means that the scanning angle is broadened by an amount corresponding to $\psi$. Accordingly, provided that the angle $\psi$ which the reflected beam $I_8$ by the lens 8 makes with the optical axis g be increased with the rotation of the scanning device 1 in the opposite direction to the direction of its rotation, the angle $\theta$ the beam $I_9$ reflected by the reflecting surface $M_2$ makes with the optical axis g will always become larger than the angle $2\phi$ the beam $I_1$ reflected by the reflecting surface $M_1$ makes with the optical axis g. As described above, the increment $\psi$ can be determined depending upon the setting of the transmission optical system, that is, the selection of the respective focal lengths of the lenses disposed within the transmission optical system. More particularly, the longer the focal length $f_2$ of the lens 2 in FIG. 1 is as compared with the focal length $f_4$ of the lens 4, the larger the angle becomes which the beam $I_4$ after passing through the lens 4 makes with the optical axis g. Also, the larger the focal length $f_6$ is as compared to the focal length $f_8$ of the lens 8, the larger the angle $\psi$ becomes which the beam $I_8$ refracted by the lens 8 makes with the optical axis g. Therefore, the angle $\theta$ the beam $I_9$ deflected by the reflecting surface $M_2$ makes with optical axis can be amplified to a desired extent relative to the angle of deflection obtained when no transmission optical system is used.

Figure 2:
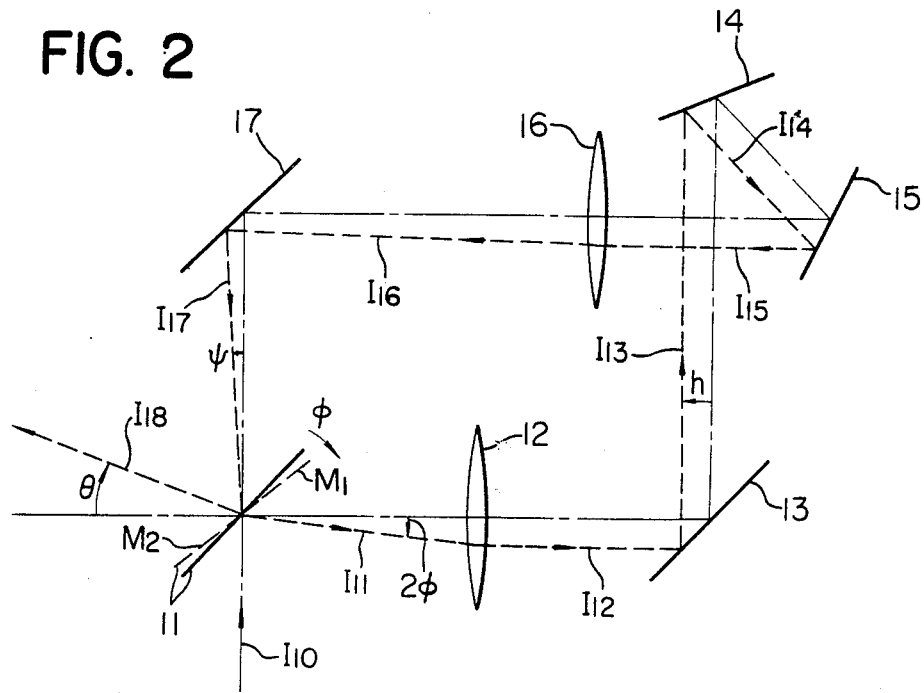
Figure 3:
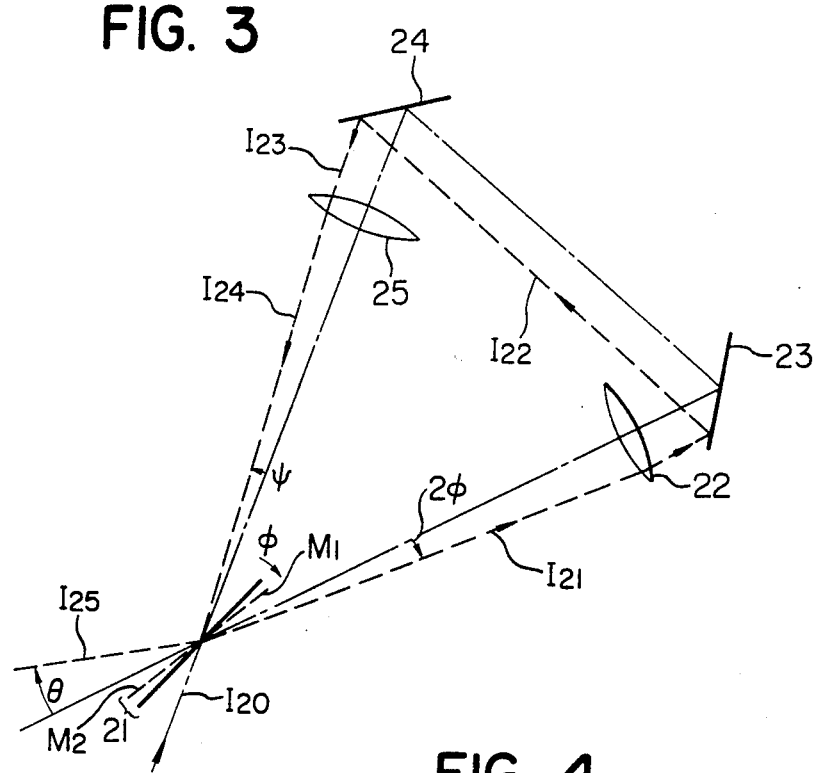
Figure 4:
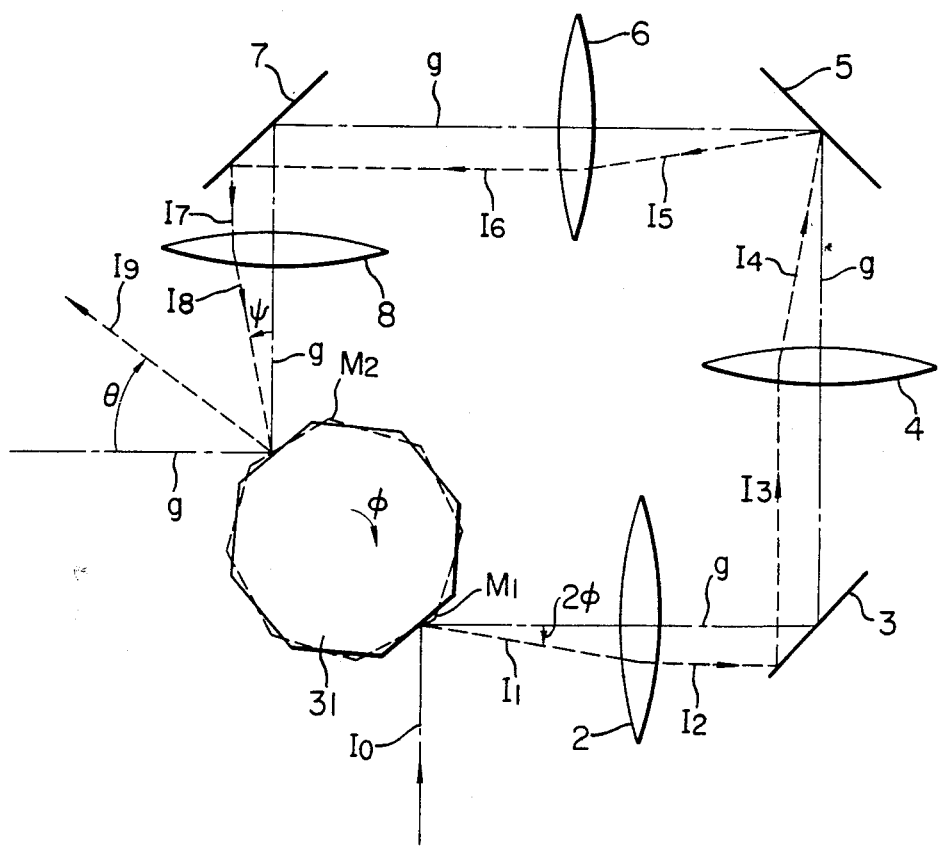

FIGS. 2, 3 and 4 show other embodiments of the scanning optical system according to the invention respectively. The embodiments of FIGS. 2 and 3 include two lens groups in the above described transmission optical system respectively whereas the embodiment of FIG. 4 contains four lens groups. In each the case of these three embodiments, there is used a coaxial optical system in which the optical axes of the lens groups disposed for the scanning optical system are coincident with each other. The position of the scanning device indicated by the solid line is a datum position for scanning and the position suggested by the phantom line (broken line) indicates the position which the scanning device takes after its rotation by angle $\phi$ from the datum position. In the datum position for scanning of the scanning device, the beam passing through the transmission optical system travels along the optical axis.

Like the scanning device in the embodiment of FIG. 1, the scanning device 11 shown in FIG. 2 is a galvanomirror with its both side surfaces being reflecting surfaces. The two lens groups (12 and 16) and the four reflecting mirrors (13, 14, 15 and 17) constitute a transmission optical system. The focal point of object side of the lens 12 and the focal point of image side of the lens 16 die in the vicinity of the reflecting surfaces ($M_1$ and $M_2$) of the scanning device 11 respectively and these lenses are so arranged that the position of focal point of image side of the lens 12 is coincident with the position of focal point of object side of the lens 16. When the scanning device 11 is rotated by angle $\phi$ from the datum scanning position, the incident beam $I_{10}$ is deflected by $2\phi$ from the optical axis g and transformed into a collimating beam $I_{11}$ by the lens 12. After being reflected by the reflecting mirrors (13, 14 and 15), the beam is refracted by the lens 16 and further after being reflected upon the reflecting mirror 17, it becomes a lens $I_{17}$ making the angle $\phi$ with the optical axis g and is incident upon the reflecting surface $M_2$ of the scanning device 11. With the rotation of the scanning device, the beam $I_{17}$ moves in the opposite direction to that of rotation of the scanning device. The angle of deflection $\theta$ (scanning angle) of the beam $I_{18}$ finally deflected by the scanning becomes: $\theta = \psi + 2\phi$. Accordingly the angle of deflection is widened.

The scanning device 21 used in the scanning system shown in FIG. 3 is the same one as used in FIG. 1. The two lens groups (22 and 25) and the two reflecting mirrors (23 and 24) constitute a transmission optical system. The focal point of the object side of the lens 22 and the focal point of the image side of the lens 25 lie in the vicinity of the reflecting surfaces ($M_1$ and $M_2$) of the scanning device 21. The focal point of the image side of the lens 22 is coincident with the focal point of the object side of the lens 25. When the scanning device 21 is rotated, the beam $I_{24}$, again incident upon the device 21 from the transmission optical system, moves in the opposite direction to the rotational direction of the scanning device 21. Therefore, as in the above described scanning systems, the beam $I_{25}$ finally deflected by the scanning device 21 becomes a beam having a widened angle of deflection.

While in the above described embodiments a galvanomirror having two reflecting surfaces has been particularly shown and described as a scanning device (1, 11, 21), the scanning device may be also a rotary polygon mirror having a number of reflecting surfaces.

FIG. 4 shows one embodiment of a scanning optical system in which a polygon mirror 31 is used as a scanning device. The arrangement of the scanning optical system shown in FIG. 4 is the same as that shown in FIG. 1 with only the exception that the rotary polygon mirror 31 is used in place of the scanning device 1 of a galvanomirror in FIG. 1.

In FIG. 4, it is shown that two surfaces being symmetric relative to the axis of rotation of the polygon are used as two reflecting surfaces $M_1$ and $M_2$ of the scanning device 31. But, this is to be understood as only one example of selection. Any other two surfaces different from each other may be selected as reflecting surfaces $M_1$ and $M_2$. In case that there is used a scanning device having a number of reflecting surfaces such as a rotary polygon mirror, a further increase of angle of deflection may be attained when two or more sets of transmission optical system are provided to amplify the angle of deflection and the deflected beam is made incident upon the single scanning device plural times repeatedly. However, also in such a case, care should be taken to avoid deflecting the scanning beam two or more times by one same reflecting surface of the scanning surface.

Figure 5:
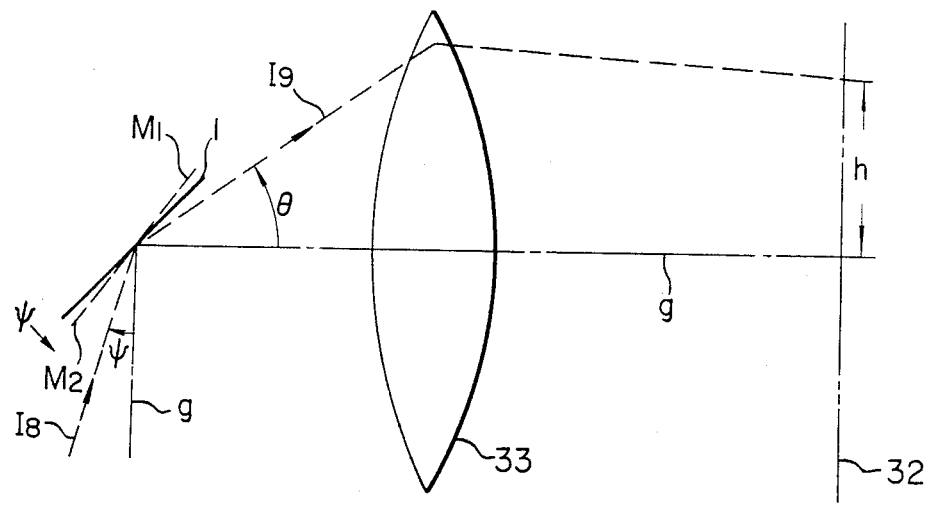
FIG. 5 is a schematic illustration of one embodiment of the optical system disposed between the scanning device according to the invention and the scanning plane.

Now, the manner of scanning on a surface to be scanned using the beam ($I_9$, $I_{18}$ or $I_{25}$) finally deflected by the scanning device will be described. FIG. 5 illustrates the manner of scanning and shows the optical system disposed between a scanning device and a surface 32 to be scanned. As one example, the scanning optical system used is shown as that of FIG. 1 and therefore the scanning device is shown to be the scanning device 1 in FIG. 1. In FIG. 5, there is shown a condenser lens 33 the focal plane of which is coincident with the scanned plane (surface to be scanned) 32. The optical axis g of the lens and the optical axis g of the above described transmission optical system are coaxial. Therefore, when the scanning device 1 is in its datum scanning position (starting position), the beam $I_9$ travels along the optical axis g of the lens 33. The symbol h is the height of focus of the scanning beam, that is, the distance between the spot of the focused beam and the intersection of the scanned plane 32 and the optical axis g. The h can be expressed by a function of the above mentioned $\theta$. This $\theta$ can be determined depending upon the arrangement, power and distortion characteristics of lenses disposed in the transmission optical system. With the rotation of the scanning device, the focused spot moves on the scanned plane 32 to carry out scanning.

In the above described embodiments, the transmission optical system is so arranged that the focal points of the neighbouring lenses are coincident with each other. But, such arrangement of transmission optical system is not always necessary. The disposition of these lenses may be varied in any manner so long as the transmission optical system is designed to have an afocal refractive power as a whole.

As seen from the previously described embodiments, the use of the transmission optical system according to the invention permits control of the angular relation between the deflection angle $2\phi$ and the angle $\psi$ at will without employing any additional scanning device in the transmission optical system. However, by providing additional scanning device(s) within the transmission optical system, the angle of deflection resulting from the whole scanning optical system can be much more widened. For example, in such case wherein the transmission optical system includes a location at which the beam becomes afocal as in the case of FIG. 1 or 4, it is preferable to provide an additional scanning device at the location in order to further broaden the angle of deflection. In the embodiment of FIG. 1 or 4, the reflection mirror 5 can be pointed out as such a location and therefore a galvanomirror or a rotary polygon mirror may be advantageously used in place of the reflecting mirror 5. In this case, the additional scanning device provided within the transmission optical system should be operated in timing with the operation of the main scanning device 1.

As to the scanning speed of the focussed spot moving on the scanned surface 32, it is preferable that the speed is constant. However, when the oscillation angle $\phi$ varies depending upon time t in a manner as represented by the equation of $\phi(t) = A \sin \omega t$ wherein A and $\omega$ are constants as in the case of a galvanomirror a or when the lens disposed within the transmission optical system between the scanning device and the scanned surface is of the type having ordinary characteristics, the moving speed of the focussed spot on the scanned plane can not become constant. The lens having ordinary characteristics mentioned above is usually referred to as a $f \cdot \tan \theta$ lens. This type of lens has such characteristic that when it has a focal length of f, the lens focusses an incident beam having an incident angle of $\theta$ in the focal plane at the height of $h = f \cdot \tan \theta$. Therefore, in order to make the speed of the focussed spot constant, it is required to use in the scanning system a lens having unordinary characteristic such as a $f - \theta$ lens or $f - \arc \sin \theta$ lens. A $f - \theta$ lens is such type of lens which has a relation of $h = f \cdot \theta$ between the incident angle $\theta$ and the height of focus h (height measured from the optical axis), provided that its focal length is f. In the same manner, a $f - \arc \sin \theta$ lens is defined as a type of lens which satisfies the equation: $h = \phi_o f \arc \sin (\theta/\phi_o)$ wherein $\phi_o$ is the angle of amplitude of galvanomirror.

The $f - \theta$ lens is used for a case wherein the incident angle $\theta$ of a beam incident upon the lens changes at a constant rate. For example, it is used when there is employed a rotary scanning device having a constant rotational speed such as a rotary polygon mirror and therefore the angular velocity of angle of deflection of the beam deflected thereby remains constant. When the scanning device used has a particular angular velocity, there is required to use a lens having a particular characteristic suitable therefor. For example, when there is used a galvanomirror which has a relation of $\phi(t) = A \sin \omega t$ as for its angle of deflection of the deflected beam, it is required to use a $f - \arc \sin \theta$ lens.

When the focussed spot moves at a constant speed on the scanned plane 32, for example, with the scanning optical system shown in FIG. 1, there can be considered the following three cases (I)–(III):

(I) Only one scanning device is used which is galvanomirror 1;

(II) Two scanning devices are used which are galvanomirror 1 and galvanomirror 5; and (III) Scanning devices are one galvanomirror 1 and one rotary polygon mirror.

Table 1 shows the types of lenses (2, 4, 6, 8 and 33) used for the above three cases (I)–(III).

TABLE 1

| Lens | Case (I) | (II) | (III) | |
|---|---|---|---|---|
| 2 | f-arcsinθ lens | f-arc sinθ lens | f-arc sinθ lens | f-arc sinθ lens |
| 4 | f-arcsinθ lens | f-θ lens | f-arc sinθ lens | f-θ lens |
| 6 | f-arcsinθ lens | " | f-arc sinθ lens | " |
| 8 | f-arcsinθ lens | f-arc sinθ lens | f-arc sinθ lens | f-arc sinθ lens |
| 33 | f-arcsinθ lens | f-arc sinθ lens | f-arc sinθ lens | f-arc sinθ lens |

Since the optical system shown in FIG. 2 is essentially equivalent to that shown in FIG. 3, an analysis of lens characteristic is made in the same manner as above, only for the scanning optical system shown in FIG. 2. The results are as follows:

(IV) The scanning device is only one designated by 11 which is a galvanomirror; and (V) The scanning device is only one designated by 11 which is a rotary mirror. Lenses (12, 16 and 33) used for the case (IV) are all to be f−arc sin θ lens and lenses (12, 16 and 33) used for the case (V) are all to be f−θ lens.

As for the scanning optical system shown in FIG. 4, the following analysis is made:

(VI) The scanning device is only one which is a rotary polygon mirror 31;

(VII) Two scanning devices are used which are one rotary polygon mirror 31 and one galvanomirror 5; and (VIII) Two scanning devices are rotary polygon mirrors 31 and 5.

Table 2 shows the characteristics of lenses (2, 4, 6, 8 and 33) for the cases (VI)–(VIII) respectively.

TABLE 2

| Lens | Case (VI) | (VII) | (VIII) |
|---|---|---|---|
| 2 | f-θ lens | f-θ lens | f-θ lens |
| 4 | " | f-arc sinθ lens | f-arc sinθ lens |
| 6 | " | " | f-arc sinθ lens |
| 8 | " | f-θ lens | f-θ lens |
| 33 | " | " | " |

In the above examples, all of the lenses have a distortion characteristic respectively to attain the uniform scanning speed. When some of the lenses used are ordinary f−tan θ lenses, the uniform scanning speed is attainable also by using lenses having a certain particular distortion characteristic other than f−θ lens and f−arc sin θ lens.

For example, in case of (I) in which all of the lenses used are f−arc sin θ lenses, the uniformity of scanning speed is proved as follows:

Provided that the oscillation of the galvanomirror is;

$$\phi(t) = \phi_0 \sin \omega t$$

and the lenses used are made to have such distortion characteristic as;

$$h = \phi_0 f_2 \arcsin\left(\frac{2\phi}{\phi_0}\right) \quad \text{for lens 2}$$

$$h = \phi_0 f_2 \arcsin\left(\frac{\phi}{\phi_0} \cdot \frac{f_4}{f_2}\right) \quad \text{for lens 4}$$

$$h = \frac{f_2 f_6}{f_4} \phi_0 \arcsin\left(\frac{\phi}{\phi_0} \cdot \frac{f_4}{f_2}\right) \quad \text{for lens 6}$$

$$h = \frac{f_2 f_6}{f_4} \phi_0 \arcsin\left(\frac{\phi}{\phi_0} \cdot \frac{f_4}{f_2} \cdot \frac{f_8}{f_6}\right) \quad \text{for lens 8 and}$$

$$h = 2\left(1 + \frac{f_6}{f_8} \cdot \frac{f_2}{f_4}\right) \phi_0 f_{33} \arcsin \frac{2\phi + \phi}{2\left[1 + \frac{f_6}{f_8} \cdot \frac{f_2}{f_4}\right] \phi_0} \quad \text{for lens 33.}$$

then the scanning speed v at which the image surface is scanned by the lens 33 becomes:

$$v = \frac{dh}{dt} = 2f_{33}\left(1 + \frac{f_6}{f_8} \cdot \frac{f_2}{f_4}\right) \phi_0 \omega$$

which is constant.

In the above, $f_2$, $f_4$, $f_6$, $f_8$ and $f_{33}$ are focal lengths of the lenses 2, 4, 6, 8 and 33 respectively.

In the same manner, the uniformity of scanning speed in case of (V) in which f−θ lenses are used can be proved as follows:

Provided that the rotational angle of the rotary polygon mirror is;

$$\phi(t) = K \cdot t,$$

wherein K is constant, and the lenses used are made to have such distortion characteristic as;

| $h = 2\phi f_{12}$ | for lens 12 |
|---|---|
| $h = f_{16} \cdot \phi$ | for lens 16 and |
| $h = (2\phi + \phi)f_{33}$ | for lens 33, wherein |

$f_{12}$, $f_{16}$ and $f_{33}$ are focal lengths of the lenses 12, 16 and 33 respectively, then the scanning speed v at which the image surface is scanned by the lens 33 becomes:

$$v = \frac{dh}{dt} = 2K\left(\frac{f_{12}}{f_{16}} + 1\right).$$

which is constant.

As for other cases listed above, the uniformity of the scanning speed can be proved in the same manner as described above in connection with Cases (I) and (V) although the description thereof is herein omitted for the sake of simplification of explanation.

Now, a description will be made as to the case where there occurs an inclination (fall-down) of the rotation axis for the scanning device referring to FIG. 6.

Figure 6:
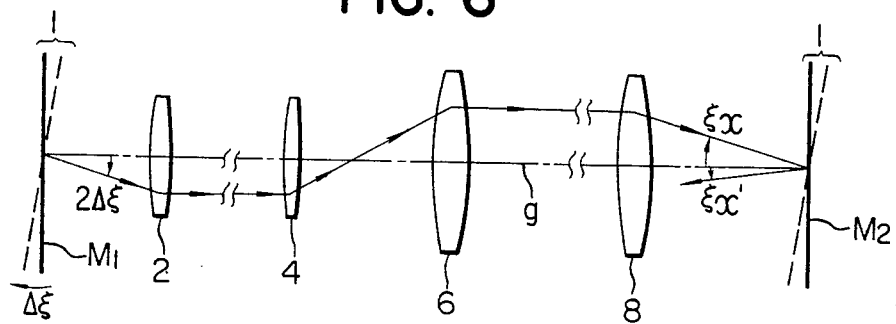
FIGS. 6 and 7 are explanatory views showing the manner in which an inclination (fall-down) is corrected through the transmission optical system in the scanning optical system according to the invention.

FIG. 6 is an expansion plan of the optical system shown in FIG. 1, showing a section thereof taken along a plane normal to the plane of drawing sheet including the optical axis.

Assume that the scanning device 1 be in its datum position and the rotation axis thereof inclined, which results in inclination of the reflecting surface by Δξ as illustrated in FIG. 6, then the beam reflected upon the reflecting surface $M_1$ of the scanning device to the lens 2 will be incident upon the lens 2 with an inclination of 2Δξ relative to the optical axis g. After passing through the lenses 4, 6 and 8 in this order, the beam is directed to the scanning device 1 but incident upon its reflection surface M$_2$. ξx is an angle which the beam incident upon M$_2$ makes with the optical axis. In this case, the direction in which the rotation axis of the scanning device 1 inclines is coincident with the direction in which ξx varies. The beam which makes an angle of ξx with optical axis g after passing through the lens 8, is reflected by the surface M$_2$ of the scanning device 1. But, it is possible to make the reflected beam travel along the optical axis or very near the optical axis making with the optical axis a much smaller angle than 2Δξ owing to the coincidence of the direction of inclination of the rotation axis with that of variation of ξx mentioned above.

If the direction in which the rotation axis of the scanning device 1 inclines is opposite to the direction of the variation of ξx resulting from the inclination of the rotation axis, then the angle ξ'x which the beam reflected by the surface M$_2$ makes with the optical axis will become larger than 2Δξ as will be understood from the principle of amplification for angle of deflection previously described.

The relation between Δξ, ξx and Δξ' in the above described scanning system can be represented by the following formula:

$$\xi'x = \xi x - 2\Delta\xi' \quad (1)$$

By setting of the focal lengths of the lenses (2, 4, 6 and 8) in the manner that the beam reflected by the surface M$_1$ and the beam incident upon the surface M$_2$ may be parallel with each other, the formula (1) gives $$\xi'x = 2(\Delta\xi - \Delta\xi') < 2\Delta\xi \quad (2)$$

Hereby assuming further that the inclined axis of the scanning device 1 be included within a plane normal to the drawing plane of FIG. 1 and including a normal of reflecting surface of the device 1 in its datum position, there will be given from the fact of Δξ=Δξ':

$$\xi'x = 0 \quad (3)$$

From the above formulae (2) and (3) it is obvious that when there occurs as inclination of rotation axis of the scanning device 1 by Δξ, the angle of inclination of the beam I$_9$ becomes smaller than 2Δξ and that the optical system has a corresponding effect for such inclination of rotation axis of the scanning device.

For a transmission optical system to make a correction for an inclination of scanning device, it is absolutely necessary that the beam initially reflected by the scanning device and the beam again incident upon the scanning device through the transmission optical system should be almost parallel with each other.

When all of the lenses disposed in the transmission optical system are spherical ones, there is no possibility to obtain the inclination correcting effect as described above, for the transmission optical systems shown in FIGS. 2 and 3. To give the correcting effect also to the transmission optical systems of FIGS. 2 and 3, it is required to use cylindrical lenses in the transmission optical system. Provided that the cylindrical lens has no refractive power in a plane normal to the beam scanning plane, the formula (2) holds and therefore it is evident that the system has an effect to correct the inclination of rotation axis of the scanning device.

Figure 7:
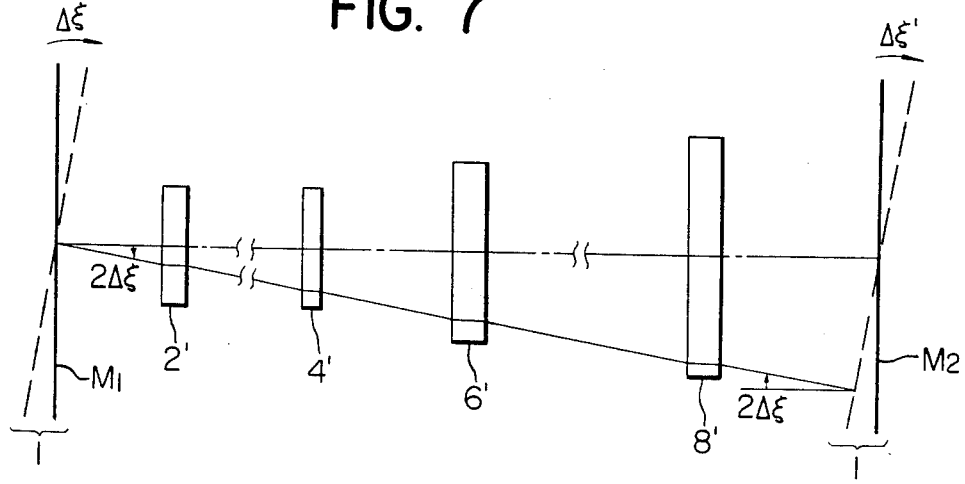

FIG. 7 illustrates an arrangement in which cylindrical lenses are used in the transmission optical system shown in FIG. 1. The scanning direction of beam is normal to the plane of drawing of FIG. 7. The cylindrical lenses 2', 4', 8' and 6' do not have any refractive power in the direction of the plane of drawing. Therefore, when the scanning device 1 inclines by Δξ and thereby the beam has an inclination angle of 2Δξ, the beam will have the same inclination angle of 2Δξ given after passing through the cylindrical lenses (2', 4', 6' and 8'). Thus, when the beam is fallen again upon the scanning device 1, the inclination angle is set off.

The above description of inclination correction concerns the case of a galvanomirror having two reflecting surfaces for scanning. In case of a rotary polygon mirror having many reflecting surfaces more than three usable for scanning, it is preferable to select two symmetrically opposed surfaces as the surface optically connected by the transmission optical system as shown in the embodiment of FIG. 4. By doing so, an adequate effect can be obtained to correct the inclination of rotation axis of the scanning device.

Figure 8:
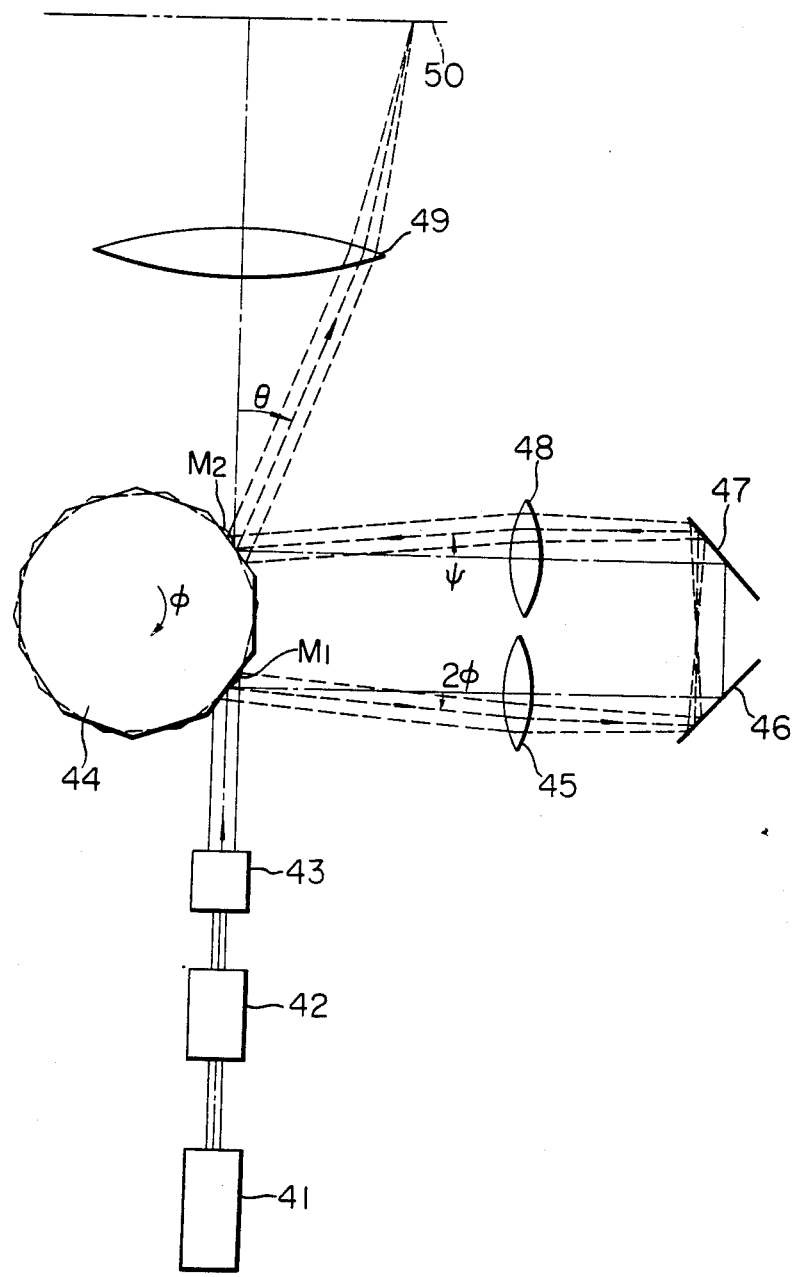
FIG. 8 schematically shows one example of laser recording apparatus to which the scanning optical system of the invention is applied.

FIG. 8 schematically shows one example of a laser recording apparatus in which the present invention is embodied.

Referring to FIG. 8, a beam emitted from a laser light source 41 is directed to a light modulator 42 which gives the beam a signal. After passing through the modulator, the beam enters a beam expander 43 which expands the diameter of the beam. The expanded beam is incident upon the rotary polygon mirror 44. The beam reflected by one reflecting surface M$_1$ of the polygon mirror 44 is incident again upon the polygon mirror 44 but on another reflecting surface M$_2$ after passing through a lens 45, reflecting mirrors 46 and 47 and a lens 48 in this order. The beam scanned again by the reflecting surface M$_2$ is forced by a condenser lens 49 on a recording medium 50 placed in the focal plane of the condenser lens.

The lenses 45 and 48 and the reflecting mirrors 46 and 47 constitute a transmission optical system which in turn constitutes, as a whole, an afocal optical system. Since the lenses 45, 48 and 49 are all f−θ lenses, the beam scans the recording medium at a uniform speed as the rotary polygon mirror 44 rotates.

What I claim is:

1. A scanning optical system capable of scanning wide angle area, said scanning optical system comprising:
   a scanning device having at least two reflecting surfaces thereon; and
   a transmission optical system for directing a beam reflected by a first reflecting surface of said scanning device to a second reflecting surface of said scanning device different from said first reflecting surface, said second surface being substantially at the opposite side of said first reflecting surface with respect to the rotational axis of said scanning device, said transmission optical system including means for moving the beam incident upon said second reflecting surface in the opposite direction from the moving direction of said second reflecting surface, means for controlling the angle which the beam incident upon said second reflecting surface makes with the optical axis of said transmission optical system with respect to the angle which the beam reflected by said first reflecting surface makes with the optical axis of said transmission optical system and in the expansion plane which is normal to the deflecting plane of the beam by said first reflecting surface and which include an optical axis, said transmission optical system directing the beam incident upon the second reflecting surface in a path approximately parallel to the beam initially reflected by said first reflecting surface;

said transmission optical system including an afocal optical system having at least a first lens group for receiving the beam reflected by said first reflecting surface and a second lens group for emitting the beam to be directed to said second reflecting surface, said first and second lens groups having substantially the same distortion characteristics.

2. A scanning optical system as claimed in claim 1, wherein the lenses disposed in said transmission optical system are cylindrical lenses having no refractive power in a plane normal to the beam scanning plane.

3. A scanning optical system as claimed in claim 1, wherein said transmission optical system including a first afocal optical system and a second afocal optical system in series.

4. A scanning optical system as claimed in claim 3, wherein said each afocal optical system includes two spherical lenses respectively.

5. A scanning optical system capable of scanning a wide angle area, said scanning optical system comprising:

a galvanomirror having at least two reflecting surfaces thereon;

a transmission optical system for directing a beam reflected by a first reflecting surface of said galvanomirror to a second reflecting surface of said galvanomirror different from said first reflecting surface, which transmission optical system includes means for moving the beam incident upon said second reflecting surface in the opposite direction from the moving direction of said second reflecting surface and means for controlling the angle which the beam incident upon said second reflecting surface makes with the optical axis of said transmission optical system with respect to the angle which the beam reflected by said first reflecting surface makes with the optical axis of said transmission optical system, said transmission optical system including an afocal optical system having at least a first lens group for receiving the beam reflected by said first reflecting surface and a second lens group for emitting the beam to be directed to said reflecting surface, said first and second lens groups having substantially the same distortion characteristics; and image forming optical system disposed between said galvanomirror and a surface to be scanned and focusing the beam reflected from said second reflecting surface on said surface to be scanned, said image forming optical system including lenses of the type which focuses an afocal beam incident upon the lens with an inclination of $\theta$ relative to the optical axis of the lens in its focal plane at the position as expressed by the formula:

$$H = \phi_o f \arc \sin \frac{\theta}{\phi_o}$$

wherein h is height measured from the optical axis, f is focal length of the lens, and $\phi_0$ is the angle of amplitude of the galvanomirror.

* * * * *

UNITED STATES PATENT AND TRADEMARK OFFICE
CERTIFICATE OF CORRECTION

PATENT NO. : 4,299,438

DATED : November 10, 1981

INVENTOR(S) : KAZUO MINOURA

It is certified that error appears in the above—identified patent and that said Letters Patent is hereby corrected as shown below:

Column 3

Line 48, change "reflected" to --refracted--.

Column 4

Line 28, change "die" to --lie--.

Column 5

Line 54, change "neighbouring" to --neighboring--.

Column 6

Line 20, after "galvanomirror", change "a" to --,--.

Line 35, change "such" to --a--.

Line 41, between "of" and "galvanomirror", insert --a--,

Lines 60 and 61, between "is" and "gal-", insert --a--.

Column 8

Line 4, change "$\frac{\phi}{\phi_0}$" to --$\frac{\psi}{\phi_0}$--,

Line 6, change "$\frac{\phi}{\phi_0}$" to --$\frac{\psi}{\phi_0}$--,

Line 9, change "$\frac{\phi}{\phi_0}$" to --$\frac{\psi}{\phi_0}$--,

Line 11, change "$2\phi+\phi$" to --$2\phi+\psi$--,

UNITED STATES PATENT AND TRADEMARK OFFICE
CERTIFICATE OF CORRECTION

PATENT NO. : 4,299,438

DATED : November 10, 1981

INVENTOR(S) : KAZUO MINOURA

Page 2 of 2

It is certified that error appears in the above—identified patent and that said Letters Patent is hereby corrected as shown below:

Line 39, change "$h = f_{16} \cdot \phi$" to --$h = f_{16} \cdot \psi$--.

Line 40, change "$h = (2\phi+\phi) f_{33}$" to --$h = (2\phi+\psi) f_{33}$--.

Column 10

Line 11, change "given" to --even--.

Line 20, change "surface" to --surfaces--.

Column 12

Line 33, change "h" to --H--.

Signed and Sealed this

Sixth Day of April 1982

[SEAL]

Attest:

GERALD J. MOSSINGHOFF

Attesting Officer — Commissioner of Patents and Trademarks